US006882758B2

(12) United States Patent
Betty

(10) Patent No.: US 6,882,758 B2
(45) Date of Patent: Apr. 19, 2005

(54) CURRENT TUNED MACH-ZEHNDER OPTICAL ATTENUATOR

(75) Inventor: Ian B. Betty, Ottawa (CA)

(73) Assignee: Bookham Technology PLC, Abingdon (GB)

(*) Notice: Subject to any disclaimer, the term of this patent is extended or adjusted under 35 U.S.C. 154(b) by 126 days.

(21) Appl. No.: 10/190,592

(22) Filed: Jul. 9, 2002

(65) Prior Publication Data

US 2004/0008965 A1 Jan. 15, 2004

(51) Int. Cl.$^7$ .................... G02F 1/225; G02B 6/10
(52) U.S. Cl. ................ 385/9; 385/2; 385/131
(58) Field of Search .................. 385/1–3, 8–9, 385/129–132

(56) References Cited

U.S. PATENT DOCUMENTS

| | | | |
|---|---|---|---|
| 5,363,457 A | 11/1994 | Falt et al. ................. | 385/3 |
| 5,524,076 A | 6/1996 | Rolland et al. ............ | 385/8 |
| 5,694,504 A | 12/1997 | Yu et al. .................. | 385/45 |
| 5,778,113 A | 7/1998 | Yu ......................... | 385/3 |
| 5,933,554 A | 8/1999 | Leuthold et al. ........... | 385/28 |
| 5,956,437 A | 9/1999 | Day et al. ................ | 385/2 |
| 5,991,471 A | 11/1999 | Yu ......................... | 385/3 |
| 6,374,001 B1 * | 4/2002 | Bozeat et al. ............. | 385/8 |
| 6,668,103 B1 * | 12/2003 | Hosoi ..................... | 385/2 |

FOREIGN PATENT DOCUMENTS

| | | | |
|---|---|---|---|
| EP | 0 505 289 A | 9/1992 | |
| EP | 0 926 532 A | 6/1999 | |
| EP | 1 020 754 A | 7/2000 | |
| EP | 1020754 A1 * | 7/2000 | ........... G02F/1/035 |
| WO | WO 2004/006007 A1 | 1/2004 | |

OTHER PUBLICATIONS

Bachmann, M., et al., "General Self–Imaging Properties in NXN Multimode Interference Couplers Including Phase Relations." Applied Optics, 1994, vol. 33, No. 18, pp. 3905–3910.

Bakhtazad, A. et al. "MMI Multiplexer for Dual–Channel Erbium–Doped Waveguide Amplifiers", Optics Express, Aug. 13, 2001, vol. 9, No. 4, pp. 178–183.

Bennett, B. R. et al., "Carrier–Induced Change in Refractive Index of InP, GaAs, and InGaAsP", Journal of Quantum Electronics, Jan. 1990, vol. 26, No. 1, pp. 113–122.

Rolland, C. et al, "10 Gbit/s 1.56$\mu$m Multiquantum Well InP/InGaAsP Mach–Zehnder Optical Modulator", Electron. Lett., 1993, vol.29, No. 5, pp. 471–472.

Soldano, L.B. et al., "Optical Multi–Mode Interference Devices Based on Self–Imaging: Principles and Applications", Journal of Lightwave Technology LT, 1995, vol. 13, No. 4, pp. 615–627.

Shyn–Lin Tsao et al., "Design of a 2×2 MMI MZI SOI electro–optic switch covering C band and L Band", Microwave and Optical Technology Letters, vol. 33, No. 4, pp. 262–265.

Mehdi Asghari, "Photonics Integration on Silicon", Terahertz and Gigahertz Photonics, Denver, CO., USA, Jul. 19–23, 1999, vol. 3795, pp. 586–595.

J.E. Zucker, et al., "Optical Waveguide Intensity Modulators Based on a Tunable Electron Density Multiple Quantum Well Structure", Applied Physics Letters, American Institute of Physics, New York, US, vol. 56., No. 20, May 14, 1990, pp. 1951–1953.

J.L. Jackel, et al., "Thermally Tuned Glass Mach–Zehnider Interferometer Used as a Polarization Insensitive Attenuator", Applied Optics, Optical Society of America, Washington, US, vol. 24, No. 5, Mar. 1, 1985, pp. 612–614.

* cited by examiner

Primary Examiner—Akm Enayet Ullah
Assistant Examiner—Jerry T Rahll
(74) Attorney, Agent, or Firm—Anthony A. Laurentano; Lahive & Cockfield, LLP

(57) ABSTRACT

A current tuned optical attenuator includes a Mach-Zehnder interferometer that relies on the creation of free carriers to create a phase difference in an optical signals along two waveguide arms.

17 Claims, 4 Drawing Sheets

CURRENT TUNED MACH-ZEHNDER OPTICAL ATTENUATOR

FIELD OF THE INVENTION

The present invention relates to optical components, and more particularly to semiconductor optical attenuators that make use of Mach-Zehnder interferometers.

BACKGROUND OF THE INVENTION

As the use of optics has become more prevalent in communications systems, a variety of components used to direct and control light waves have been developed. One such component is an optical attenuator. Optical attenuators are typically used to limit the power of an optical light source. This is for example necessary to limit transmitted power to a receiver.

Often attenuators are combined with other components. For example, an optical modulator is often combined and even integrated with an attenuator. The attenuator reduces the power of an optical light source, so that a modulated light source is provided at a desired output power level.

One known attenuator relies on electro-absorption and is formed as a reverse-biased junction in a semiconductor material. The degree of attenuation is controlled by varying the reverse bias voltage across the junction, the designed optical mode overlap with this junction, and by the separation between the semiconductor material's absorption band-edge and the operating wavelength of the attenuator. Such electro-absorption attenuators may be integrated with a semiconductor optical modulator. Conveniently, electro-absorption attenuators are easily fabricated, take limited space on an integrated circuit, and may be formed in the same grown structure as the optical modulator.

Disadvantageously, for these attenuators the level of attenuation is wavelength, polarization and temperature dependent.

Moreover, when an electro-absorption attenuator is formed as part of an integrated circuit, sharing a common growth structure with other semi-conductor devices, performance of the attenuators and/or the other devices must sometimes be compromised. For example, when an electro-absorption attenuator is integrated with a Mach-Zehnder modulator, the performance of both the attenuator and the modulator must typically be compromised to allow the operation of both devices, since the ideal operating wavelength relative to the semi-conductor band-edge is different for both the attenuator and modulator.

Integrating components creates additional difficulties. For example, multiple electro-absorption attenuators are often placed in series to obtain a desired level of attenuation. This in turn requires increased space on an integrated circuit on a semi-conductor substrate. Further, electro-absorption attenuators must dissipate energy taken from the input signal in some form. Typical, this energy is dissipated as heat, or otherwise absorbed by the substrate on which the attenuator is formed. This energy may impact the performance of proximate components on the substrate.

Another form of attenuator uses a Mach-Zehnder interferometer. Phase modulation in one or two legs of a Mach-Zehnder interferometer is converted to amplitude modulation. The phase modulation may be accomplished by changing the index of refraction of one of the legs. Although this form of attenuator does not suffer from the same problems as conventional electro-absorption attenuators, it does require a greater surface area, which is not desirable in integrated semiconductor components. Historically when this form of attenuator has been formed on an integrated circuit with a Mach-Zehnder modulator it has typically used the same index change mechanism as the modulator.

Clearly then, there is a need for an improved optical attenuator that lends itself to integration with other optical components.

SUMMARY OF THE INVENTION

Accordingly, it is one object of the present invention to provide an attenuator that may be formed in a reduced area.

In accordance with the present invention, an optical attenuator includes a Mach-Zehnder interferometer that relies on the creation of free carriers to create a phase difference between the optical signals in the two arms of the interferometer.

In accordance with an aspect of the present invention, there is provided an optical attenuator including: a Mach-Zehnder interferometer including an optical signal splitter providing first and second outputs; a first waveguide leg in optical communication with the first output, having in cross section for at least a portion of its length, a semiconductor junction; a second waveguide leg in optical communication with the second output; a power source interconnected to forward bias the semiconductor junction to produce excess carriers in the first leg affecting the index of refraction of the first leg, and thereby the phase difference of a wave at outputs of the first and second waveguide legs; a combiner in optical communications with the outputs, to produce a composite optical signal having an amplitude that varies in dependence on the phase difference.

In accordance with another aspect of the present invention, there is provided a method of attenuating an input optical signal including splitting the input optical signal into first and second optical signals; passing one of the first and second optical signals through an optical waveguide formed of a semiconductor junction; forward biasing the junction to create free carriers in the waveguide, affecting an index of refraction of the waveguide, thereby varying an optical length of the waveguide, to create a phase difference between the first and second optical signals; recombining the first and second optical signals to generate a recombined optical signal whose amplitude varies in dependence on the phase shift.

In accordance with yet another aspect of the present invention, there is provided an optical attenuator including a Mach-Zehnder interferometer including: an optical signal splitter providing first and second outputs; a first waveguide leg in optical communication with the first output, having in cross section for at least a portion of its length, a semiconductor junction; a second waveguide leg in optical communication with the second output; an electrode to apply a forward bias to the semiconductor junction to produce excess carriers in the first leg affecting the index of refraction of the first leg, and thereby the phase difference of a wave at outputs of the first and second waveguide legs, the electrode having a length between about 100 $\mu$m and 200 $\mu$m; a combiner in optical communications with the outputs, to produce a composite optical signal having an amplitude that varies in dependence on the phase difference.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Figure 1:
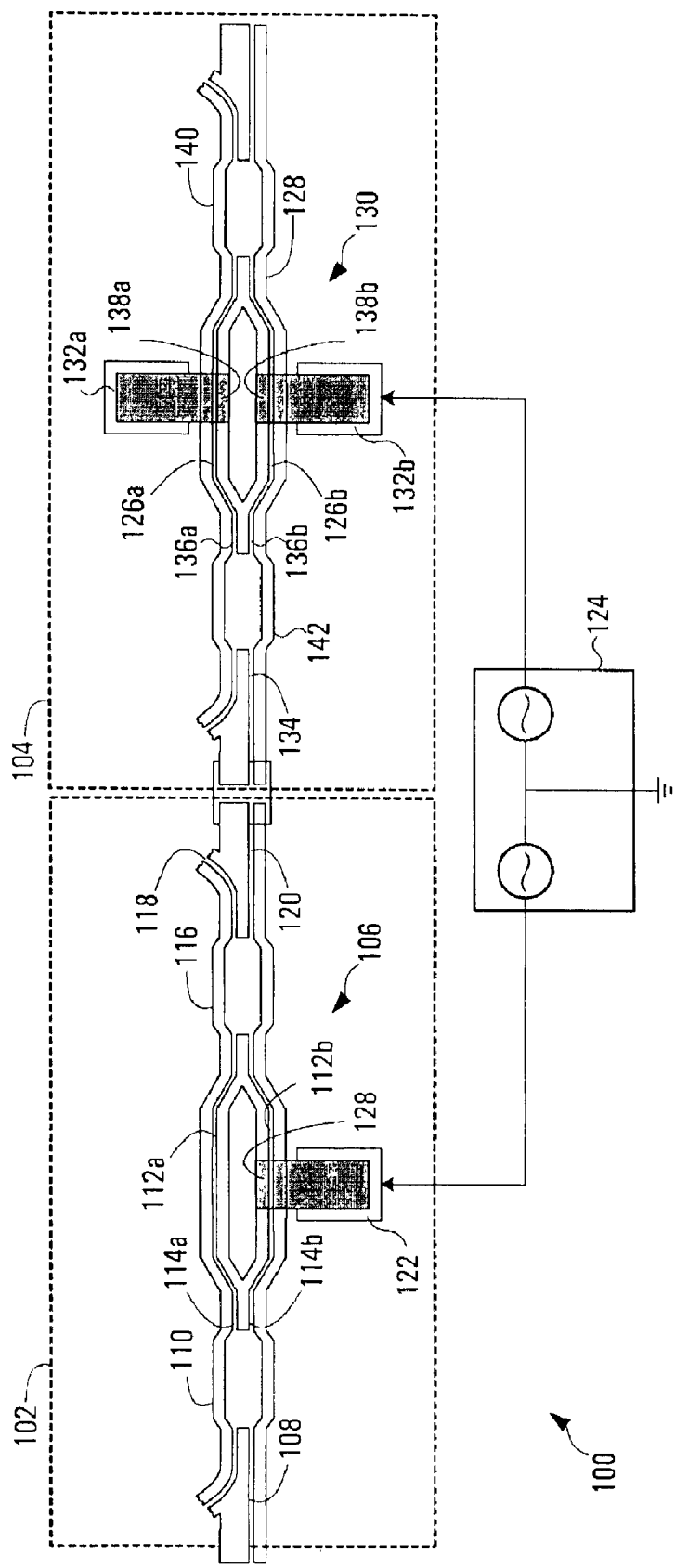
FIG. 1 illustrates a combination attenuator and modulator, exemplary of an embodiment of the present invention.

FIG. 1 illustrates a combination 100 optical attenuator and modulator, exemplary of an embodiment of the present invention and for use in an optical communications system. Combination 100 includes serially connected attenuator 102 and modulator 104.

Attenuator 102 includes an input waveguide 108 for receipt of an input optical signal, produced by an optical source (not shown). The input optical source is preferably a conventional continuous wave laser, emitting light at a chosen wavelength typically between 1470 and 1620 nm. Attenuator 102 includes a Mach-Zehnder interferometer 106.

The output of attenuator 102 in turn is optically coupled to a modulator 104 that provides a modulated output of the optical source. An electrical on/off signal representative of an information signal to be modulated may be provided to modulator 104.

The electrical signal to the modulator and attenuator may, for example, be provided by a power source 124. Power source 124 may be any suitable source of electrical energy. It may, for example, be provided by a power supply as bias voltage to control attenuation. It may be a signal source, providing a modulating signal, or the like.

Modulator 104 is interconnected downstream of attenuator 102 and may include a conventional Mach-Zehnder interferometer 130. Modulators formed of Mach-Zehnder interferometers 130 (also referred to as Mach-Zehnder modulators) are well known and understood in the art. Example Mach-Zehnder modulators and their methods of construction are for example detailed in U.S. Pat. Nos. 5,694,504, 5,524,076, 5,991,471, and 5,363,457.

Figure 2:
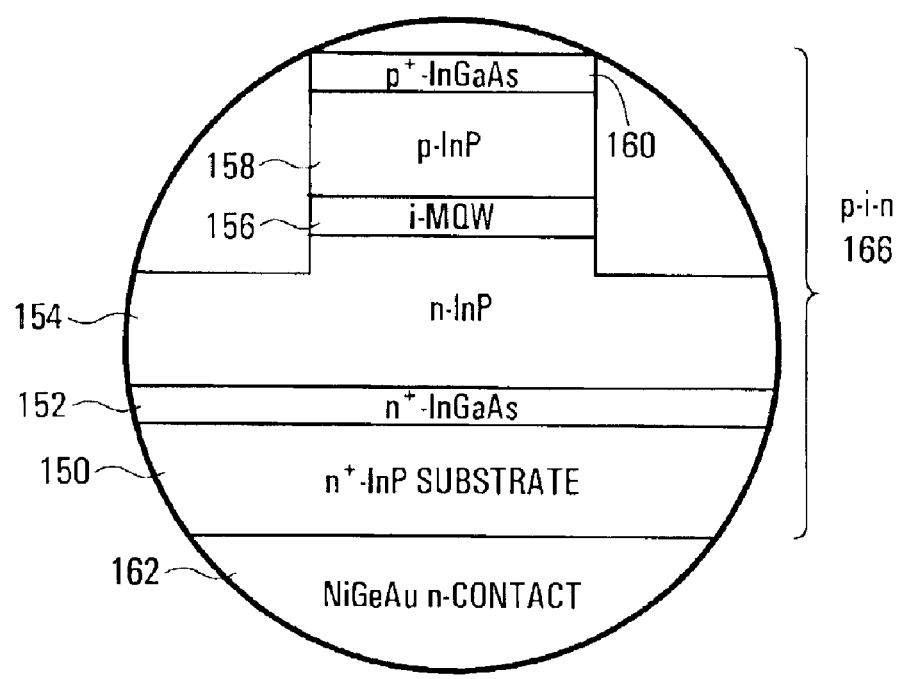
FIG. 2 illustrates the cross section of a semiconductor material used to form an integrated combination of FIG. 1.

As will be appreciated, exemplary combination 100 may be integrated on a semiconductor substrate. The material used to form Mach-Zehnder interferometer 130 is characterized by a non-linear electro-optic effect in the presence of an electric field, caused by a reverse bias across a semiconductor p-i-n junction. As will become apparent, Mach-Zehnder interferometer 106 of attenuator 102 does not rely on the same electro-optic effect. Conveniently, however, Mach-Zehnder interferometer 106 may be formed on the same grown structure. Examples of suitable materials are III–V alloys, InGaAsP/InP or AlGaAs/GaAs, as well as certain II–VI alloys. A cross-sectional view of an example substrate defining legs 126a and 126b of Mach-Zehnder interferometer 130, and legs 112a and 112b of Mach-Zehnder interferometer 106 is illustrated in FIG. 2. As will be appreciated, the remainders of Mach-Zehnder interferometers 130 and 106 are formed of with like cross-section. The layers illustrated in FIG. 2 may be grown by known epitaxial techniques such as Metal Organic Chemical Vapour Deposition (MOCVD). The example structure shown in FIG. 2 includes a n+InP substrate 150 on which is grown a thin InGaAs absorbing layer 152. Next an n-type InP cladding layer 154 is grown followed by a multi-quantum-well 156 (MQW layer. An example MQW 156 comprises a plurality of quaternary (InGaAsP) layers (not shown) separated by InGaAsP barrier layers (also not shown.) Although a MQW 156 is described, a single quantum-well or a single bulk layer formed of, for example, InGaAsP or another semiconductor material different from adjacent n and p layers, may also be used. A p-type InP cladding layer 158 is grown on top of the MQW 156 and finally a p+ InGaAs layer 160 that serves as a contact enhancement layer and as an absorbing layer. P-type contacts formed as pads 132a and 132b (FIG. 1) are selectively formed on top of layer 160. An n-type contact 162 is formed on the substrate side. The waveguide ridges or arms are simultaneously etched through the MQW layer as shown. A similar structure is described by Rolland et al, "10 Gb/s 1.56 μm Multiquantum Well InP/InGaAsP Mach-Zehnder Optical Modulator", Electron. Left., Vol.29, pp. 471–472,1993. As should be appreciated, layers 150–160 form a semiconductor p-i-n junction 166.

As illustrated in FIG. 1, example Mach-Zehnder interferometer 130 includes an input waveguide 134, serially connected to an input optical splitter 142 and having outputs to waveguides 136a and 136b. Splitter 142 splits an optical signal at waveguide 134 into first and second optical signals along waveguides 136a and 136b. Waveguides 136a and 136b bend to provide in-phase optical signals to (modulator) legs 126a and 126b of Mach-Zehnder interferometer 130. An output combiner 140 re-combines the waveguides 136a and 136b and thereby the outputs of legs 126a and 126b.

Splitter 142 and combiner 140 may be formed in any number of ways. For example, splitter 142 and combiner 140 may be formed as optical Y junctions, multi-mode interference ("MMI") coupler, or otherwise. Use of MMI couplers is preferred, as detailed below.

Legs 126a and 126b are optically parallel and connected to a modulating electrode 138a and 138b. Modulating electrodes 138a and 138b are bonded to electrical conducting pads 132a and 132b. A bias modulation voltage may be applied to pads 132a and 132b, by for example, an appropriate source. This voltage could, for example, be provided by source 124 or any other source coupled or separate from source 124.

Typically, the optical characteristics of the legs 126a and 126b are identical in the absence of a bias voltage on pads 132a and 132b. As understood by those of ordinary skill in the art, application of a bias voltage to pads 132a and 132b creates a potential difference between substrate 150 (FIG. 2) and pads 132a and 132b. This results in a change of the refractive index of legs 126a and 126b of waveguides 136a and 136b. That is, an applied potential difference between the substrate of Mach-Zehnder interferometer 130 and pads 132a or 132b changes the refractive index of a corresponding leg 126 by applying an electric field across the intrinsic region of the p-i-n structure 166 (FIG. 2) along the length of each leg 126a, 126b. These, in turn change the refractive index of the legs 126a and 126b, and their effective optical length. As will be appreciated by those of ordinary skill in the art, the creation of this path difference relies largely on the quantum confined stark effect or the Franz-Keldysh effect. As further understood by those of ordinary skill, use of these effects allows the path difference to be varied at extremely high speeds allowing modulator 104 to modulate signals at rates in excess of 40 Gbits/s.

Preferably, when a chosen voltage difference $V_\pi$ is applied to one of pads 132a and 132b it creates a relative optical path difference along the branch legs 126a and 126b, equal to an odd integer multiple of one half the wavelength of the optical signal (i.e. $\lambda/2, 3\lambda/2, 5\lambda/2, \ldots$) carried by each of the legs 126a and 126b. This optical path difference turns the optical signal on the output of the modulator from off to on or from on to off. Of course, legs 126a and 126b could alternatively be operated in push pull mode where both arms are prebiased by $-V_\pi/2$ and then swung in opposite directions by $V_\pi/2$ to obtain the chosen voltage difference of $V_\pi$ between legs 126a and 126b. Modulator 104 may thus be used to modulate a binary electrical signal provided by a signal source onto an optical source at an input of waveguide 134.

As will be appreciated, the observed quantum confined stark effect allows for finite changes in the refractive index of legs 126a and 126b. In order to effect a relative shift in phase of one half the wavelength of the light produced by a typical laser used in telecommunications applications, electrodes 124a and 124b along the lengths of legs 126a and 126b are typically between 400 μm to 600 μm.

Attenuator 102 is formed in a manner similar to modulator 104. Attenuator 102 may attenuate an input optical signal, prior to its provision to modulator 104. As noted, attenuator 102, however, does not rely on the quantum confined stark effect or similar electro-optical field effects. Specifically, attenuator 102 includes a Mach-Zehnder interferometer 106, formed on a semi-conductor material having the same cross-section as Mach-Zehnder interferometer 130, illustrated in FIG. 2. As illustrated in FIG. 1 attenuator 102 thus includes an input waveguide 108, and optical splitter 110 feeding two optical waveguides 114a and 114b, passing along legs 112a and 112b of Mach-Zehnder interferometer 106. Leg 112b is electrically connected to a modulating electrode 122. Modulating electrode 122 is bonded to electrical conducting pad 128.

An optical combiner 116 combines paths 122a and 122b, and thereby the output of legs 112a and 112b. Optical combiner 116 is preferably formed as a 2×2 (MMI) coupler, providing an output of Mach-Zehnder interferometer 106 at port 120. MMI couplers, such as combiner 116, are more particularly detailed in "Optical Multi-Mode Interference Devices Based on Self-Imaging: Principles and Applications" Soldano, L. B. and Pennings, E. C. M., Journal of Lightwave Technology LT, 1995, Vol.13, Number 4, pp. 615 ["Soldano"] and "General self-imaging properties in N×N multimode interference couplers including phase relations." Bachmann, M., Besse, P. A. and Melchior, H., Applied Optics, 1994, Vol. 33, Number 18, pp. 3905–3911 ["Bachmann"].

Unlike Mach-Zehnder interferometer 130 of modulator 104, Mach-Zehnder interferometer 106 of attenuator 104, relies on carrier induced changes in the refractive index of legs 112b. Accordingly electrical pad 128 and electrode 122 allows a current to be established through junction 166 of leg 112a. Electrical current may be provided by any suitable source, such as power source 124. This current in turn is believed to effect the refractive index along leg 112a. This phenomenon is more particularly detailed in "Carrier-induced Change in Refractive Index of InP, GaAs, and InGaAsP", Brian R. Bennett, Richard A. Soref, Jesus A. Del Alamo, Journal of Quantum Electronics, Vol. 26, No.1, January 1990, pp. 113–122. Thus, as should now be appreciated, although semiconductor junction 166 of leg 112b has been described as a specific p-i-n junction, a junction 166 could be formed of any suitable semiconductor materials giving rise to a sufficient free carrier density in the presence of a forward bias.

Again, changes in the refractive index along legs 112a and 112b of waveguides 114a and 114b cause relative phase differences in the waves at the outputs of these waveguides.

Optical combiner 116 includes two output ports 118 and 120 formed as part of the MMI coupler. The amplitude of the optical signal at output port 120 varies in dependence on the phase difference of the waves at the outputs of waveguides 114a and 114b. Output port 120 feeds the output waveguide of attenuator 102. Port 118 channels the remainder of optical signal provided to the input of combiner 116.

Specifically, an MMI coupler forming combiner 116 is a waveguide designed to support a large number of lateral modes (typically $\geq 3$). As is more fully described in Soldano and Bachmann, in a multimode waveguide, an arbitrary input optical signal can be described by a field profile which can be decomposed into a set of modes in the MMI structure. Images of the input field profile are reproduced at periodic intervals along the propagation direction of the guide. This mechanism is known as "self-imaging." At a given length, there may be either "single" or "multiple" images. The images may be upright or reversed. This periodic self-imaging occurs because the different modes propagate at different velocities and they interfere with each other and, as in normal optical interferences, the interference between excited modes in an MMI structure can be constructive or destructive. Specifically, for a 2×N paired interference MMI structure, N-fold images occur at distances $L=L_\pi/N$, where $L_\pi$ is the beating length of the two lowest-order guided modes. For instance, in a 2×2 MMI coupler, at a distance $L=L_\pi/2$ from the input ports, the first pair of images of the input field profile is formed. At a distance $L=L_\pi$, a single reversed image is formed. This self-imaging mechanism is employed in 2×2 MMI coupler 116 to project the input signals onto the two output ports 118 and 120.

As is known to a person skilled in the art and more fully described in Soldano and Bachmann, a 2×2 MMI coupler can be made, by choosing the appropriate width and length of the multimode waveguide, such that, with its two input signals coherent, the distribution of its output power at the two output ports directly depends on the phase difference ($\Delta\Theta$)) between its two input signals. Particularly, as the two signals arrive in-phase and 180° out of phase, the two output ports can be alternatively turned "on" and "off" respectively, whereas power is variably distributed between the two output ports when the phase difference changes between the two extremes.

For example, when the two coherent input signals to the 2×2 MMI coupler forming combiner 116 in FIG. 1 have travelled no difference in optical path length, the output power at output port 120 may be at the maximum while the output power at output port 118 may be at a minimum. As phase difference between the two input signals varies, the output power at output port 120 decreases and the output power at port 118 continuously increases. If the two coherent input signals have traversed an optical path difference of $\lambda/2$, the output power at output port 120 is a minimum and the output power at port 118 is a maximum.

Although the combining function may be similarly performed by other types of couplers such as Y junction couplers, directional couplers, or 2×1 MMI combiners, a 2×2 MMI coupler is preferred. A 2×2 MMI coupler is preferred to a 2×1 MMI as a 2×2 MMI coupler reduces back reflections and the excitation of unguided radiation modes potentially present in 2×1 MMI combiners.

Moreover, combiner 116 when formed as an MMI coupler can be formed in a very small area. That is, the typical length of directional couplers is several millimetres or more due to the large coupling lengths and due to the size of the branching network that separates the input waveguides. In an MMI coupler on the other hand, the images of the input field can be reproduced at relatively close distances thereby reducing the size of the coupler. For example, a 2×2 MMI coupler may be formed having a length well below 1 mm long, typically with a length between 100–500 μm.

Further, combiner 116 when formed as an MMI coupler is low-loss with a weak dependence on the polarization or wavelength.

Finally, as is also well known to a person skilled in the art, MMI couplers have very good fabrication tolerance. This of course, facilitates production of combination 100.

For all of the above reasons, splitter 110 and optical spitters 142 and combiners 140 within modulator 104 may similarly be formed as MMI couplers.

Conveniently, port 118 may be used to guide energy removed from the input signal at input waveguide 108 from the substrate on which combination 100 is formed. In this way, energy to be dissipated as a result of attenuation of the optical signal at input waveguide 108 may dissipated "off chip" without affecting the operation of other integrated components.

As will be appreciated by those of ordinary skill in the art use of free carrier injection in attenuator 102 as caused by forward bias along of the p-i-n junction forming leg 112b allows a substantial change in the index of refraction in leg 112b when compared to changes in refractive index caused by the application of an electric field. As a result the length of leg 112b can be made significantly shorter than the length of a leg in an equivalent Mach-Zehnder interferometer, reliant on the quantum confined stark effect (such as the Mach-Zehnder interferometer 130), the Franz Keldysh effect, or the linear electro-optic effect, while still being able to effect an equivalent relative phase shift. Relative changes of refractive index of 0.05 have been observed for injected currents creating free carrier concentrations of $10^{19}$ cm$^{-3}$.

Further, unlike non-linear electro-optic effects, like the quantum confined stark effect or Franz-Keldysh effect, the free carrier induced change in refractive index is polarization independent and only weakly dependent on wavelength in practical telecommunications applications.

Attenuator 102 in the example embodiment of FIG. 1 may thus be formed using an electrode 122 having a length between 100 and 200 μm. The overall length of attenuator may be between 591 μm and 816 μm.

Disadvantageously however, the rate of change in the index of refraction of forward biased leg 112b depends on the free carrier density. That is, the free carriers generated by forward-bias current must recombine before the index of refraction returns to the non-biased index of refraction of leg 112b. This typically takes in the order of tens of nanoseconds. As such, Mach-Zehnder interferometer 106 has a switching time significantly slower than the switching time of modulator 104. However, this is quite acceptable for an attenuator.

Further, the nanosecond carrier recombination time would allow the attenuator to be used as a low speed modulator at speeds on the order of megahertz. Such low speed modulation could, for example, be used to modulate a low speed identifying signal (for example, less than 100 MHz) onto a light source, in addition to the modulation of any data. Again, this identifying signal could be provided by source 124.

As should now be appreciated, attenuator 102 attenuates an input optical signal at waveguide 108 by splitting it into first and second optical signals and guiding these along legs 112a and 112b. A forward bias of a junction of one of these legs creates free carriers in the associated waveguide, affecting its index of refraction, and thereby varying an optical length of this waveguide. This creates a phase difference between the first and second optical signals. These first and second optical signals are recombined to form a recombined optical signal whose amplitude varies in dependence on this phase difference. The recombined signal is provided to modulator 104, where information may be modulated. At modulator 104, the recombined signal is again split into third and fourth optical signals by splitter 142. One of these signals is passed through leg 126b of waveguide 136b. A reverse biasing of the semiconductor junction of leg 126b changes the index of refraction of this waveguide, thereby varying its optical length, to create a phase difference between said third and fourth optical signals. The third and fourth optical signals are recombined to generate an output optical signal whose amplitude varies in dependence on the relative phase shift of the third and fourth optical signals.

As should also now be appreciated, the Mach-Zehnder interferometer 130 of modulator 104 could be replaced by an equivalent Mach-Zehnder interferometer 106, such replacement would significantly limit the maximum operating speed of combination 100.

Figure 3:
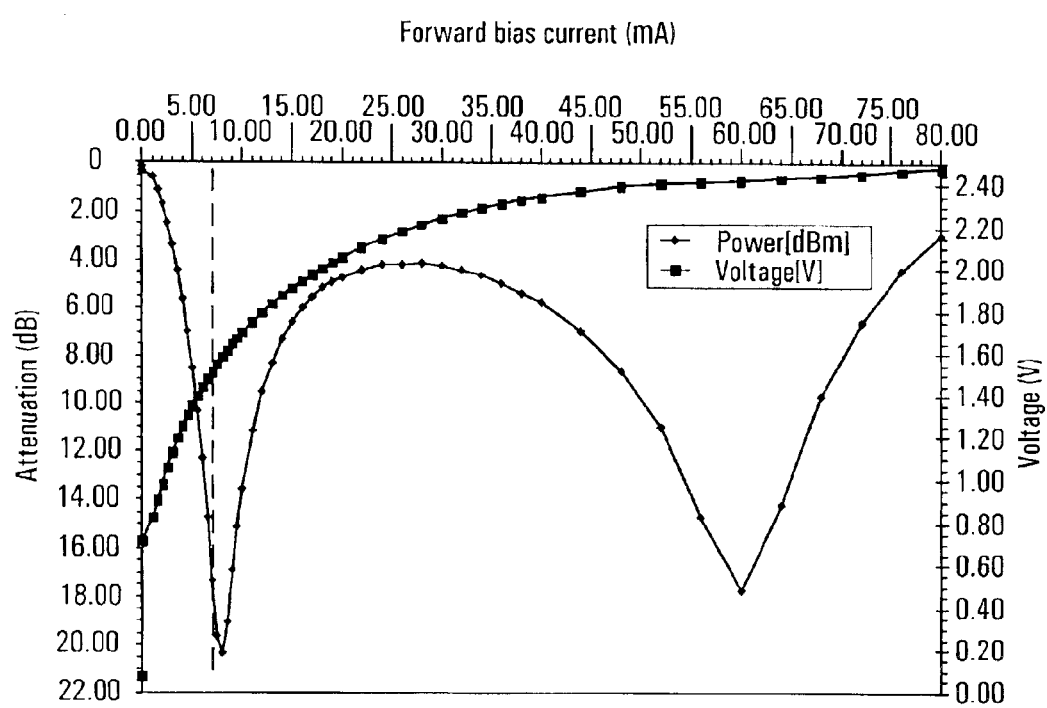
FIG. 3 is a plot illustrating current attenuation relationship of the attenuator of FIG. 1.

FIG. 3 further illustrates the attenuation of the example attenuator 102 as a function of current through leg 112b. As illustrated for this particular junction optimized for modulator 104 which utilizes the quantum confined stark effect, a 200 μm electrode may induce between 0 and 22 dB of attenuation for a control current between 0 and 8.2 mA. As illustrated, the half wavelength shift and maximum attenuation may be observed for a current of 8.2 mA.

Figure 4:
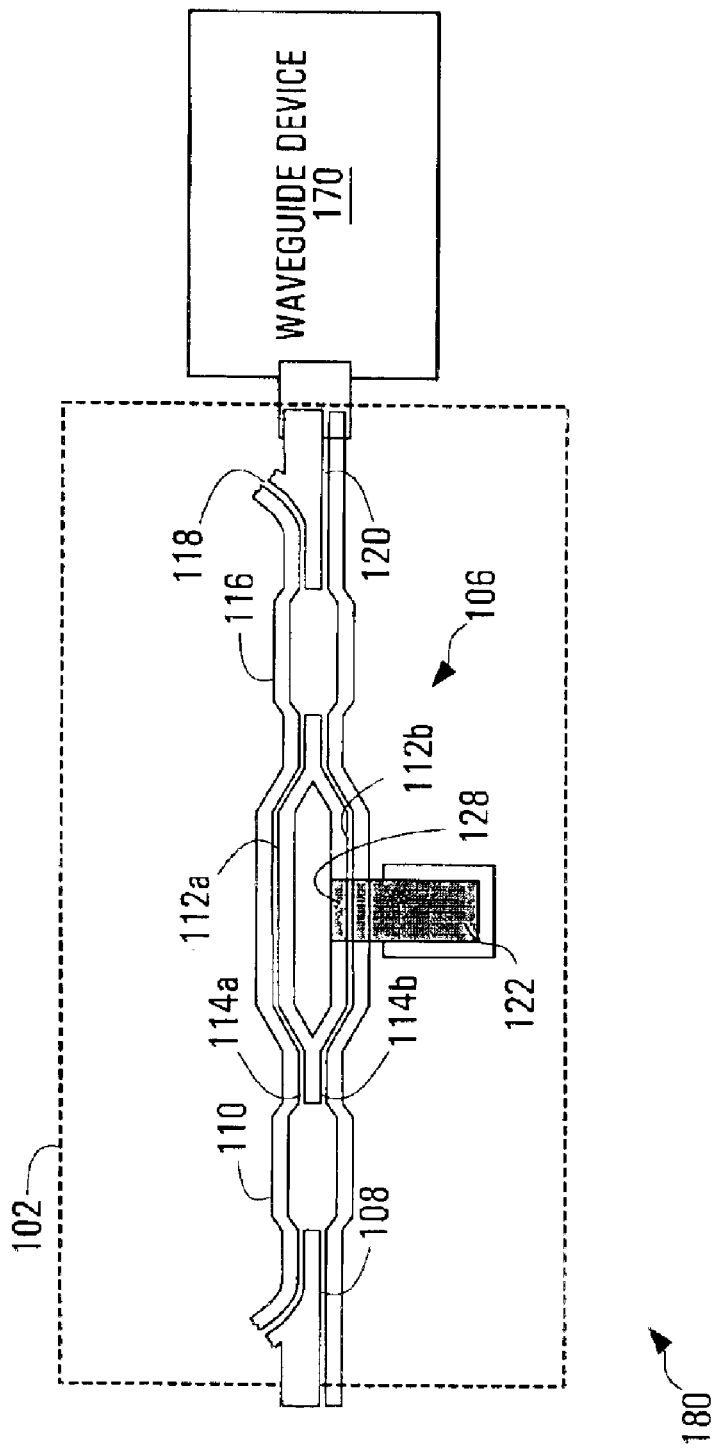
FIG. 4 illustrates a combination attenuator and waveguide device, exemplary of another embodiment of the present invention

Of course, the above described embodiments are intended to be illustrative only and in no way limiting. Many modifications are possible. For example, attenuator 102 could be used in conjunction with any arbitrary waveguide device 170, in combination 180 as illustrated in FIG. 4. If the waveguide device requires a semiconductor junction that can give rise to sufficient free carriers in the presence of a forward bias, the attenuator and waveguide device can be formed on the same substrate with a single epitaxial growth. Attenuator 102 could also be used as a stand alone component. Multiple attenuators 102 could be cascaded in series, to provide composite attenuation in excess of what a single attenuator may provide. A single or multiple power sources may provide the appropriate forward bias voltage. Of course, in the embodiment of combination 100 the order of attenuator 102 and modulator 104 could be reversed—attenuator 102 could be placed downstream of modulator 104.

All documents referred to herein are hereby incorporated herein by reference for all purposes.

As should now be appreciated, the described embodiments of carrying out the invention are susceptible to many modifications of form, arrangement of parts, details and order of operation. The invention, rather, is intended to encompass all such modification within its scope, as defined by the claims.

What is claimed is:

1. An optical device, comprising:
   an input waveguide for receiving an input signal;
   an optical attenuator for attenuating an optical signal, said optical attenuator including a Mach-Zehnder interferometer having:
      an optical signal splitter providing first and second outputs;
      a first waveguide leg in optical communication with said first output, having in cross section for at least a portion of its length, a semiconductor junction;
      a second waveguide leg in optical communication with said second output;
      a power source interconnected to forward bias said semiconductor junction to produce excess carriers in said first leg affecting the index of refraction of said first leg, and thereby the phase difference of a wave at outputs of said first and second waveguide legs; and
      a combiner in optical communications with said first and second outputs, to produce a composite optical signal having an amplitude that varies in dependence on said phase difference, and a Mach-Zehnder modulator to modulate an information signal onto said optical signal, wherein said Mach-Zehnder modulator includes:

two modulator waveguide legs each guiding a portion of said input signal, each of said modulator waveguide leas having in cross section for at least a portion of its length, a semiconductor junction; and a power source reverse biasing a semi-conductor junction of at least one of said two modulator waveguide leas to alter the index of refraction thereof, and thereby the phase difference of waves at outputs of said two modulator waveguide legs.

2. The attenuator of claim 1, wherein said combiner comprises a multi-mode interference coupler.

3. The attenuator of claim 2, wherein said optical signal splitter comprises a multi-mode interference coupler.

4. The attenuator of claim 2, wherein said combiner comprises a port for directing a fraction of energy at said first and second outputs from said interferometer, said fraction varying in dependence on said phase difference.

5. The attenuator of claim 1, wherein said junction comprises a p-i-n junction.

6. The attenuator of claim 1, wherein said power source forward biases said Junction to conduct between 0 and 10 mA of current.

7. The attenuator of claim 6, wherein said power source modulates an identifying signal, at a frequency of less than 100 MHz.

8. The attenuator of claim 6, wherein said optical attenuator comprises an electrode to forward bias said junction, and wherein said electrode has a length between about 100 $\mu$m and 200 $\mu$m along a length of said first waveguide.

9. The device of claim 1, wherein said semiconductor junction comprises p-i-n junction having an intrinsic layer that is a bulk layer formed of a substance different from its p and n layer.

10. An optical attenuator comprising: at least two optical attenuators as claimed in claim 1 cascaded in series, with an output of one of said two attenuators providing an input to said other one of said two attenuators.

11. The device of claim 1, wherein said semiconductor junctions of said modulator waveguide legs define at least one quantum well.

12. An optical attenuator comprising:

a Mach-Zehnder interferometer having:

an input optical signal splitter providing first and second outputs;

a first waveguide leg in optical communication with said first output, having in cross section for at least a portion of its length, a semiconductor junction;

a second waveguide leg in optical communication with said second output;

an electrode to apply a forward bias to said semiconductor junction to-produce excess carriers in said first leg affecting the index of refraction of said first leg, and thereby the phase difference of a wave at outputs of said first and second waveguide legs, said electrode having a length between about 100 //m and 200 //m;

a combiner in optical communications with said outputs, to produce a composite optical signal having an amplitude that varies in dependence on said phase difference, and a Mach-Zehnder modulator to modulate an information signal onto said input optical signal, wherein said Mach-Zehnder modulator includes:

two modulator waveguide legs each guiding a portion of said input optical signal, each of said modulator waveguide legs having in cross section for at least a portion of its length, a semiconductor junction; and a power source reverse biasing a semi-conductor junction of at least one of said two modulator waveguide legs to alter the index of refraction thereof, and thereby the chase difference of waves at outputs of said two modulator waveguide legs.

13. A method of attenuating an input optical signal, comprising:

splitting said input optical signal into first and second optical signals;

passing one of said first and second optical signals through an optical waveguide formed of a semiconductor junction;

forward biasing said junction to create free carriers in said waveguide, affecting an index of refraction of said waveguide, thereby varying an optical length of said waveguide, to create a phase difference between said first and second optical signals;

recombining said first and second optical signals to generate a recombined optical signal whose amplitude varies in dependence on said phase shift;

modulating an information signal onto said input optical signal using a Mach-Zehnder modulator, wherein said Mach-Zehnder modulator includes two modulator waveguide legs each guiding a portion of said input optical signal, each of said modulator waveguide legs having in cross section for at least a portion of its length, a semiconductor junction and a power source for reverse biasing a semi-conductor junction of at least one of said two modulator waveguide legs to alter the index of refraction thereof, and thereby the phase difference of waves at outputs of said two modulator waveguide legs.

14. The method of claim 13, further comprising directing a portion of said first and second signal, as recombined to a sink port.

15. The method of claim 13, wherein said forward bias generates a current of less that 10 mA in said semiconductor junction.

16. The method of claim 13, wherein said semiconductor junction comprises a p-i-n junction.

17. The method of claim 13, further comprising:

splitting said recombined optical signal into third and fourth optical signals;

passing one of said third and fourth optical signals through another optical waveguide formed of a semiconductor junction;

reverse biasing said junction of said another waveguide to change an index of refraction of said another waveguide, thereby varying its optical length, to create a phase difference between said third and fourth optical signals;

recombining said third and fourth optical signals to generate an output optical signal whose amplitude varies in dependence on said phase shift of said third and fourth optical signals.

* * * * *